United States Patent
Wee et al.

(10) Patent No.: US 7,499,510 B2
(45) Date of Patent: Mar. 3, 2009

(54) METHOD FOR ESTIMATING A WEIGHTING VECTOR FOR AN ADAPTIVE PHASED ARRAY ANTENNA SYSTEM

(75) Inventors: Daniel Wee, Garland, TX (US); Hang Jin, Plano, TX (US)

(73) Assignee: Cisco Technology, Inc., San Jose, CA (US)

(*) Notice: Subject to any disclaimer, the term of this patent is extended or adjusted under 35 U.S.C. 154(b) by 150 days.

(21) Appl. No.: 11/651,764

(22) Filed: Jan. 10, 2007

(65) Prior Publication Data

US 2007/0268815 A1    Nov. 22, 2007

Related U.S. Application Data

(60) Provisional application No. 60/801,928, filed on May 20, 2006.

(51) Int. Cl.
*H04L 1/02* (2006.01)
*H04B 7/08* (2006.01)

(52) U.S. Cl. .......................... 375/347; 455/132
(58) Field of Classification Search .............. 375/267, 375/316, 347; 455/132
See application file for complete search history.

(56) References Cited

U.S. PATENT DOCUMENTS

| | | | |
|---|---|---|---|
| 6,665,545 B1 | 12/2003 | Raleigh et al. | 455/562.1 |
| 6,795,424 B1 | 9/2004 | Kapoor et al. | 370/343 |
| 2004/0178954 A1* | 9/2004 | Vook et al. | 342/383 |
| 2005/0101259 A1 | 5/2005 | Tong et al. | 455/69 |
| 2006/0019709 A1 | 1/2006 | Kim et al. | 455/562.1 |

* cited by examiner

*Primary Examiner*—Tesfaldet Bocure
(74) *Attorney, Agent, or Firm*—Edell, Shapiro & Finnan, LLC

(57) ABSTRACT

The present invention discloses a low-complexity estimation method for obtaining a weighting vector for an antenna system with adaptive phased arrays. A first matrix is generated from a plurality of statistically independent symbols of the receiving signals. The plurality of statistically independent symbols is received from two or more antennas over some period of time without a prior knowledge of the properties of the symbols. A second matrix, which is the covariance matrix of the first matrix, is calculated. Subsequently, a column or row is selected from the second matrix to be the weighting vector for two or more antennas in an adaptive phased array antenna system.

27 Claims, 1 Drawing Sheet

100

METHOD FOR ESTIMATING A WEIGHTING VECTOR FOR AN ADAPTIVE PHASED ARRAY ANTENNA SYSTEM

CROSS REFERENCE

The present application claims the benefit of U.S. Provisional Application Ser. 60/801,928, which was filed on May 20, 2006.

BACKGROUND

Unlike a wireless base transceiver station (BTS) in a conventional antenna configuration, a BTS equipped with an adaptive phased array antenna system utilizes power more efficiently and significantly increases the signal to noise ratio of its wireless communication channels. As a result, the capacity and the coverage area of the wireless communication system are improved.

In order to achieve the highest performance, a specific vector, called a weighting vector or spatial signature, must be applied to the array of antennas in an adaptive phased array antenna system. An optimal weighting vector for an adaptive phased array antenna system is deduced from the covariance matrix of the receiving signals.

In an orthogonal frequency division multiplexing (OFDM) wireless communication system, a receiving signal is expressed as a unit of symbols. The OFDM wireless communication method divides a broadband channel into a number of narrowband channels. A narrowband channel in the OFDM wireless communication system is denoted as a subcarrier or tone. The data carried by the broadband channel is distributed among the narrowband channels. An OFDM period is a unit of time for a wireless station to transmit or receive a symbol that is composed of the signals from all narrowband subcarriers.

An OFDM symbol can be defined as one of the following: the signal received in one OFDM period or the signal received in one subcarrier of one OFDM period. Based on the $2^{nd}$ definition, an OFDM communication system with N subcarriers has N OFDM symbols in one OFDM period.

There are two challenges in obtaining an optimal weighting vector from the covariance matrix in an OFDM wireless communication system. First, conventional methods for estimating an optimal weighting vector or spatial signature for an array of antennas, such as Singular Value Decomposition (SVD), are computationally expensive. In fact, computational complexity increases exponentially with an increase in the number of elements in the covariance matrix.

Second, most of the conventional methods for estimating an optimal weighting vector require the support of pilot signal or preamble symbols. The use of a pilot signal or preamble symbol increases the overhead of a wireless communication system and reduces the capacity of the communication system.

Several blind estimation techniques, such as the constant modulus (CM) criterion, are developed to reduce the overhead incurred by a pilot signal or preamble symbol. Instead of relying on a pilot signal or preamble signal with a known code sequence, the blind estimation techniques estimate a weighting vector or spatial signature based on unknown symbols. The downside of these conventional methods is that they are also computationally expensive.

As such, what is desired is a method and system for obtaining an optimal weighting vector for an adaptive phased array antenna system that involves lower computational complexity and little overhead incurred by a pilot or preamble signal.

SUMMARY

The construction and method of operation of the invention, however, together with additional objects and advantages thereof, will be best understood from the following description of specific embodiments when read in connection with the accompanying drawings.

The present invention discloses a low-complexity estimation method for obtaining a weighting vector for an antenna system with adaptive phased array. A first matrix is generated from a plurality of statistically independent symbols of the receiving signals. The plurality of statistically independent symbols is received from two or more antennas over some period of time without a prior knowledge of the properties of the symbols. A second matrix, which is the covariance matrix of the first matrix, is calculated. Subsequently, a column or row is selected from the second matrix to be the weighting vector for two or more antennas in an adaptive phased array antenna system.

BRIEF DESCRIPTION OF THE DRAWING

The drawings accompanying and forming part of this specification are included to depict certain aspects of the invention. The invention may be better understood by reference to one or more of these drawings in combination with the description presented herein. It should be noted that the features illustrated in the drawings are not necessarily drawn to scale.

DESCRIPTION

Figure 1:
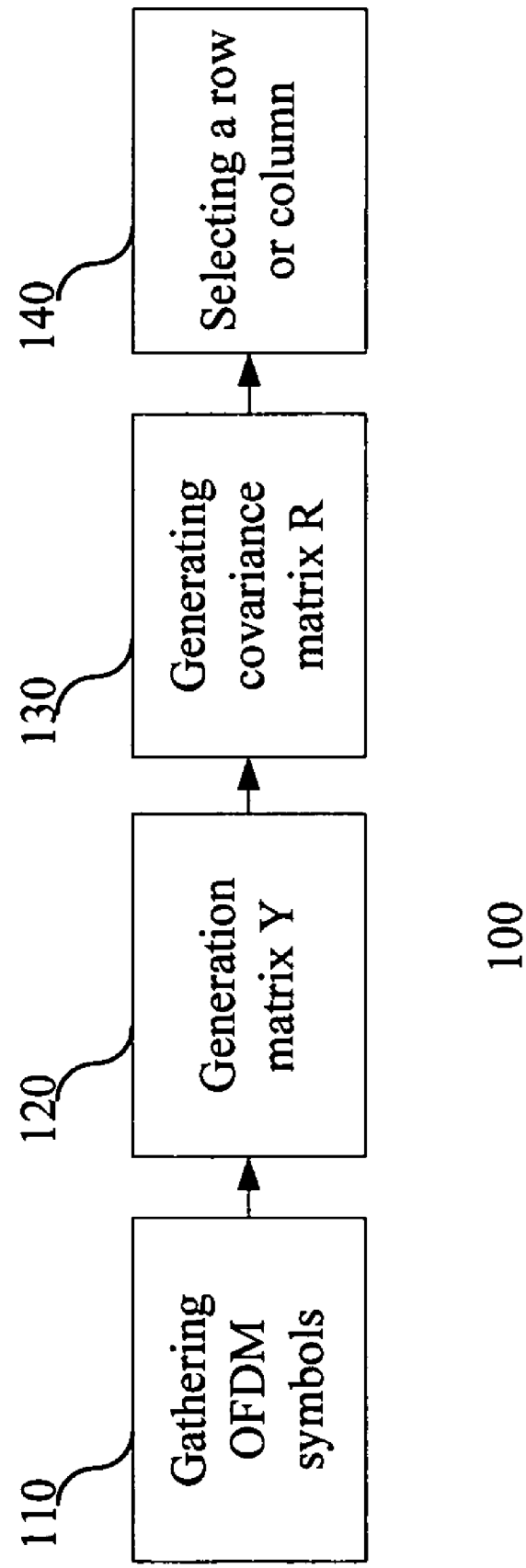
FIG. 1 is a flow diagram describing the method disclosed in the present invention.

The following detailed description of the invention refers to the accompanying drawings. The description includes exemplary embodiments, not excluding other embodiments, and changes may be made to the embodiments described without departing from the spirit and scope of the invention. The following detailed description does not limit the invention. Instead, the scope of the invention is defined by the appended claims.

The present invention discloses a method and system with low computational complexity for estimating an optimal weighting vector for the antennas in an adaptive phased array antenna system with a blind estimation technique. The method and system disclosed in the present invention estimates a weighting vector that is less accurate than one estimated by a conventional method. The advantage of the simplification of the estimation process in the invention outweighs a small degree of inaccuracy in the weighting vector.

To determine an optimal weighting vector for an array of antennas in an adaptive phased array antenna system, a set of statistically independent OFDM symbols, called a weighting set, is collected from each customer premises equipment (CPE) in some OFDM periods. The OFDM symbols can be obtained from different channels, different frequencies, or different time slots, or by different codes for CDMA, or the combination of the above. There is no a prior knowledge about the properties of the OFDM symbols, i.e. they are collected blindly.

The larger the number of symbols in the weighting set, the higher the energy is gathered. In other words, as the number of OFDM periods increases, so is the amount of the energy gathered. With more energy gathered, the estimated weighting vector becomes more accurate, provided that the channel characteristics remain relatively stable. FIG. 1 is a flow diagram describing such method disclosed in the present invention.

In step 110, a BTS in a wireless communication system has m antennas and signals are collected in n OFDM periods. Let $$Y_i = \begin{bmatrix} a_{i1}s_i \\ a_{i2}s_i \\ \vdots \\ a_{im}s_i \end{bmatrix}$$

be the vector representing the OFDM symbols that the BTS receives on m antennas in OFDM period i, where $a_{ij}s_i$ is the perturbed receiving symbol of $s_i$, received by antenna j, where $j \in \{1, \ldots, m\}$.

In step 120, the m×n weighting set matrix Y is denoted as follows:

$$Y = \begin{bmatrix} a_{11}s_1 & a_{21}s_2 & \cdots & a_{n1}s_n \\ a_{12}s_1 & a_{22}s_2 & \cdots & a_{n2}s_n \\ \vdots & & & \\ a_{1m}s_1 & a_{2m}s_2 & \cdots & a_{nm}s_n \end{bmatrix}.$$

The perturbed receiving symbol $a_{ij}s_i$ is described by the following equation: $a_{ij}s_i = H(s_i) + n_i$, where H is the function describing the channel characteristics, $s_i$ is the transmitting symbol, and $n_i$ is the channel noise. Because the channel function changes relatively slow, $Y_i$ and $Y_j$ in the weighting set matrix Y, where $i, j \in \{1, \ldots, n\}$, are closely correlated.

In step 130, the covariance matrix R of the weighting set matrix Y is calculated according to the following equation:

$$R = YY^H = \begin{bmatrix} \sum_{i=1}^{n} a_{i1}a_{i1}^*s_is_i^* & \sum_{i=1}^{n} a_{i1}a_{i2}^*s_is_i^* & \cdots & \sum_{i=1}^{n} a_{i1}a_{im}^*s_is_i^* \\ \sum_{i=1}^{n} a_{i2}a_{i1}^*s_is_i^* & \sum_{i=1}^{n} a_{i2}a_{i2}^*s_is_i^* & \cdots & \sum_{i=1}^{n} a_{i2}a_{im}^*s_is_i^* \\ \vdots & \vdots & \vdots & \vdots \\ \sum_{i=1}^{n} a_{im}a_{i1}^*s_is_i^* & \sum_{i=1}^{n} a_{im}a_{i2}^*s_is_i^* & \cdots & \sum_{i=1}^{n} a_{im}a_{im}^*s_is_i^* \end{bmatrix},$$

where operator $(.)^H$ denotes Hermitian of the enclosed vector.

By applying the conventional Singular Values Decomposition (SVD) method to the covariance matrix R, an optimal weighting vector can be obtained in a way that is computationally expensive.

The method disclosed in the present invention obtains a suboptimal weighting vector for the BTS, equipped with an adaptive phased array antenna system, from the covariance matrix R by selecting a column from the covariance matrix R according to some predetermined criteria in the wireless communication system in step 140.

If the rows and columns of a weighting set matrix Y are transposed, the transposed weighting set matrix Y generates a covariance matrix R. A suboptimal weighting vector for the BTS is obtained from the covariance matrix R by selecting a row.

In one embodiment of the disclosed method, a column or row with the maximum norm is selected to be the weighting vector for the antenna array. A wireless communication system that requires maximum power will employ the said embodiment.

In another embodiment of the disclosed method, the average SNR of each receiving antenna is calculated and a column or row that corresponds to the antenna with the highest average SNR is selected. A wireless communication system that requires a high signal to noise ratio will employ the said embodiment.

Yet in another embodiment of the disclosed method, a column or row is selected in a predetermined round robin fashion. A wireless communication system that requires a stable weighting vector will employ the said embodiment. Employing the round robin method has the same effect as taking the long term average of the $Y_i$ in the weighting set matrix Y, where $i \in \{1, \ldots, n\}$. As a result, the weighting vector is stabilized.

The method disclosed in the present invention can be applied to a wireless communication system with OFDM modulation, it is also applicable to a wireless communication system with other types of modulation or a combination of one or more modulation schemes. For example, the method can be applied to a TDMA or CDMA system or a system using CDMA on top of OFDM or OFDMA.

In a TDMA or CDMA system, the symbols are obtained from different channels and/or from different times to form the weighting set matrix Y. In a system using CDMA on top of OFDM or OFDMA, the symbols that form the matrix Y can be obtained from a combination of the output of the CDMA channels and OFDM (or OFDMA) channels and from different time periods.

The disclosed method can be applied to other systems with similar functions. One example is a filter chain with n delay taps. For a system with multiple-delay taps, each tap is analogous to an antenna. The way to calculate a weighting vector of the delay taps is the same as that of the antenna array in an adaptive phased array antenna system. The method disclosed in the present invention can be applied.

This invention describes an estimation method with low complexity for obtaining a weighting vector with a blind estimation technique.

By collecting a weighting set of statistically independent OFDM symbols from each CPE in some OFDM periods, the BTS generates a weighting set matrix and subsequently calculates the covariance matrix of the weighting set matrix. A column or row is then selected from the covariance matrix of the weighting set matrix to be the weighting vector of the antennas in an adaptive phased array antenna system.

The above illustration provides many different embodiments or embodiments for implementing different features of the invention. Specific embodiments of components and processes are described to help clarify the invention. These are, of course, merely embodiments and are not intended to limit the invention from that described in the claims.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims. Accordingly, it is appropriate that the appended claims be construed broadly and in a manner consistent with the scope of the invention, as set forth in the following claims.

What is claimed is:

1. A method comprising:

obtaining a plurality of symbols contained in signals received by two or more antennas of an antenna system with adaptive phased array antennas without any prior knowledge of the properties of the plurality of symbols;

generating a first matrix from the received the plurality of symbols contained in the signals received by the two or more antennas;

generating a second matrix by computing a covariance of the first matrix; and determining a weighting vector for the two or more antennas by selecting one of the rows or columns of the second matrix.

2. The method of claim 1, wherein the plurality of symbols is a set of statistically independent symbols over a predetermined period of time.

3. The method of claim 2, wherein obtaining comprises obtaining the set of statistically independent symbols from signals received in multiple channels.

4. The method of claim 2, wherein obtaining comprises obtaining the set of statistically independent symbols from signals received in two or more time slots.

5. The method of claim 2, wherein obtaining comprises obtaining the set of statistically independent symbols from signals received in two or more codes in a code division multiple access system.

6. The method of claim 1, wherein generating the first matrix comprises turning two or more symbols received by each of the two or more antennas during a predetermined time into corresponding elements of each column of the first matrix.

7. The method of claim 1, wherein generating the first matrix comprises turning two or more symbols received by each of the two or more antennas during a predetermined time into corresponding elements of each row of the first matrix.

8. The method of claim 1, wherein determining the weighting vector comprises selecting one of the columns or rows of the second matrix having a maximum norm.

9. The method of claim 1, wherein determining the weighting vector comprises selecting one of the columns or rows of the second matrix having a highest average signal-to-noise ratio.

10. The method of claim 1, wherein determining the weighting vector comprises selecting one of the columns or rows of the second matrix in a predetermined round robin fashion.

11. A method comprising:

obtaining a plurality of symbols contained in signals received by two or more antennas of an antenna system with adaptive phased array antennas without any prior knowledge of the properties of the plurality of symbols, wherein the plurality of symbols is a set of statistically independent symbols over a predetermined period of time;

generating a first matrix by turning two or more symbols received by each of the two or more antennas during a predetermined time into corresponding elements of each column of the first matrix;

generating a second matrix by computing a covariance of the first matrix; and determining a weighting vector for the two or more antennas by selecting one of the rows or columns of the second matrix.

12. The method of claim 11, wherein obtaining comprises obtaining the set of statistically independent symbols from signals received in multiple channels.

13. The method of claim 11, wherein obtaining comprises obtaining the set of statistically independent symbols from signals received in two or more time slots.

14. The method of claim 11, wherein obtaining comprises obtaining the set of statistically independent symbols from signals received in two or more codes in a code division multiple access system.

15. The method of claim 11, wherein determining the weighting vector comprises selecting one of the columns of the second matrix having a maximum norm.

16. The method of claim 11, wherein determining the weighting vector comprises selecting one of the columns of the second matrix having a highest average signal-to-noise ratio.

17. The method of claim 11, wherein determining the weighting vector comprises selecting one of the columns of the second matrix in a predetermined round robin fashion.

18. A method comprising:

obtaining a plurality of symbols contained in signals received by two or more antennas of an antenna system with adaptive phased array antennas without any prior knowledge of the properties of the plurality of symbols, wherein the plurality of symbols is a set of statistically independent symbols over a predetermined period of time;

generating a first matrix by turning two or more symbols received by each of the two or more antennas during a predetermined time into corresponding elements of each row of the first matrix;

generating a second matrix by computing a covariance of the first matrix; and determining a weighting vector for the two or more antennas by selecting one of the rows or columns of the second matrix.

19. The method of claim 18, wherein obtaining comprises obtaining the set of statistically independent symbols from signals received in multiple channels.

20. The method of claim 18, wherein obtaining comprises obtaining the set of statistically independent symbols from signals received in two or more time slots.

21. The method of claim 18, wherein obtaining comprises obtaining the set of statistically independent symbols from signals received in two or more codes in a code division multiple access system.

22. The method of claim 18, wherein determining the weighting vector comprises selecting one of the rows of the second matrix having a maximum norm.

23. The method of claim 18, wherein determining the weighting vector comprises selecting one of the rows of the second matrix having a highest average signal-to-noise ratio.

24. The method of claim 18, wherein determining the weighting vector comprises selecting one of the rows of the second matrix in a predetermined round robin fashion.

25. The method of claim 1, wherein generating the second matrix comprises transposing rows and columns of the first matrix.

26. The method of claim 11, wherein generating the second matrix comprises transposing rows and columns of the first matrix.

27. The method of claim 18, wherein generating the second matrix comprises transposing rows and columns of the first matrix.

* * * * *